Aug. 26, 1969    F. D. GIBSON, JR., ET AL    3,463,707

ELECTRODEPOSITION OF LEAD DIOXIDE

Filed Jan. 13, 1966

INVENTORS
Fred D. Gibson, Jr.
Bruce B. Halker
Robert L. Thayer

BY Hall, Pollock & Vande Sande
ATTORNEYS

3,463,707
ELECTRODEPOSITION OF LEAD DIOXIDE
Fred D. Gibson, Jr., Las Vegas, and Bruce B. Halker and
Robert L. Thayer, Henderson, Nev., assignors to Pacific
Engineering and Production Co. of Nevada
Continuation-in-part of application Ser. No. 474,179,
July 22, 1965. This application Jan. 13, 1966, Ser.
No. 520,341
Int. Cl. C23b 5/50, 5/54, 9/00
U.S. Cl. 204—15                                    22 Claims

ABSTRACT OF THE DISCLOSURE

Methods for and products of electrodeposition of lead dioxide on various substrates from electrolytes containing lead nitrate and nitric acid involving the use of free nitric acid in a concentration of about 5 to about 20 grams per liter and treating the electrolyte to reduce its iron content to below .02 gram per liter calculated as free iron. Processes for manufacture of lead dioxide involving plating onto a substrate first a thin layer and then a thick layer of lead dioxide and removing the thick layer while retaining the thin one in place.

---

This application is a continuation-in-part of my copending U.S. patent application Ser. No. 474,179 filed July 22, 1965, and now abandoned, which application, in turn, is a continuation of my U.S. patent application Ser. No. 464,292 filed June 16, 1965 and now abandoned.

Lead dioxide, also known as anhydrous plumbic acid, lead peroxide and lead superoxide, is a very useful material. When provided in the form of a pure, finely divided particulate solid, it is useful as an oxidizer in explosives and in incendiary devices, as a curing agent in the manufacture of polysulfide rubber and also in the manufacture of dyestuffs and intermediates. When provided in the form of a relatively thin coating upon the surface of an electrically conductive supporting base or substrate, it is useful as an electrode in corrosive electrolytes. For instance, a substrate coated with lead dioxide is useful as an anode in the electrolytic production of a wide variety of compounds exemplified by sodium chlorate; sodium perchlorate; alkali earth hypochlorites, chlorates and perchlorates; chlorine, sodium hypochlorite; sodium bromate, sodium iodate; sodium periodate, potassium chlorate and perchlorate; iodic acid; periodic acid; potassium bromate; potassium iodate; and potassium periodate. Such anodes also find applications in chrome plating.

When it is desired to produce an anode comprising a coating of lead dioxide on a base substrate for use in an electrochemical cell, it is of great importance that the lead dioxide coating be tightly adherent to the substrate material, and that the coating be uniform, non-porous, and able to withstand a substantial amount of abuse. The various prior art processes have involved the electrodeposition of lead dioxide from a solution containing a lead salt. For the most part, these processes have developed anodes which are not suitable for electrochemical use as inert or insoluble anodes because they suffered from one or more of the following defects: (a) the lead dioxide deposit was not uniform and not sufficiently adherent to the electrode surface; (b) the lead dioxide coating was too porous and too coarse; (c) the lead dioxide deposit would not withstand the normal abuse associated with routine handling in a commercial plant; and (d) the active life of the electrode was drastically shortened due to excessive plate corrosion, particularly above the solution level at the electrical buss connection. These defects, the consequent unreliability of the lead dioxide anodes, and the costliness of the various expedients that have been proposed with the object of avoiding such defects, hampered their acceptance and compelled the use of platinum anodes. The latter, although more dependable, involve a very large original investment, suffer from platinum losses in processing, require a higher power input, and exhibit a lower efficiency than the anodes of this invention.

It was not until the advent of the process disclosed and claimed in Patent 2,945,791, issued July 1960 to Fred D. Gibson, Jr., one of the joint inventors of the present invention, that the manufacture and use of lead dioxide anodes became entirely practical. That patent discloses a process for the electrodeposition of lead dioxide on a graphite substrate, and it is pointed out therein how the resultant lead dioxide coating is characterized by compactness and high density, hardness, smoothness, and a fine, randomly-oriented crystalline structure firmly bound to the graphite base. These characterizing features make it possible to use the resulting anodes in the electrolytic production of chlorine, chlorates, perchlorates, and other products without any further treatment. The completed anodes incorporate the mechanical strength of the graphite substrate, thereby overcoming many of the most trying difficulties which had previously been experienced. The making of an electrical connection to the anode is extremely simple, since contact can be made directly to the uncoated upper few inches of the graphite itself and need not be made to the lead dioxide coating. This process of making lead dioxide anodes and also the superior anodes resulting from such process have enjoyed considerable commercial success, being quite widely used in various parts of the world.

A considerable amount of experience in using the anodes made according to the process of the said Patent 2,945,791 has now been accumulated, and this experience demonstrates that, although such anodes are superior to any known lead dioxide anodes of the prior art, anodes are nevertheless occasionally produced which do not have a coating which is tightly adherent over the entire surface. When this occurs, the corrosive electrolyte can attack the substrate during subsequent use, thereby progressively deteriorating the quality of the lead dioxide coating in that area. When such a condition is found to exist it must, of course, be quickly remedied, and this requires the shutting down of the cell employing the defective anode and the replacement of such anode with a new one. This involves not only the cost of providing a new anode but also results in a decrease in production of the shutdown time of the cell. Thus, if a way could be found to increase anode life, operating costs could be reduced substantially.

In the prior art, including the aforesaid Patent No. 2,945,791, the electrolytes proposed for deposition of lead dioxide have generally included lead nitrate, copper nitrate, nickel nitrate, and nitric acid. It may also be advantageous to include in the electrolyte small amounts of sodium fluoride and a surface-active agent as disclosed, for example, in the aforesaid Patent No. 2,945,791. These various ingredients serve various purposes. For instance, it has been considered important for the copper nitrate to be present to effect preferential plating of copper rather than lead on the cathodes of the cells in which the lead dioxide anodes are being prepared. While the copper does tend to build up deposits which would eventually short-circuit the cells unless they were periodically shut down to remove such deposits, such shut-downs, though expensive, are still less objectionable than the consequences of permitting lead to deposit on the cathodes. The presence of the nickel nitrate has been considered an important factor in the attainment of desirable fineness in the crystalline structure of the lead dioxide deposit. Experience in the manufacture of high purity lead dioxide, such as is required in the anodes intended for use in electrochemical production of chlorine, chlorates, perchlorates and other compounds, has shown that the above-described electrolytes should have an acid concentration of less than about 5 grams per liter. Although lead dioxide will, to be sure, plate out in the presence of higher concentrations of acid, the resultant deposit generally has been decidedly inferior in quality. In actual practice, therefore, the acid concentration has been limited to about 2 to 3 grams acid per liter of electrolyte.

The continued research to produce improved lead dioxide anodes on the one hand and to reduce the cost of their production on the other hand has led to the improved process of the present invention by which we have provided the surprising result of producing such improved electrodes while at the same time making possible the use of an electrolyte having fewer ingredients than heretofore thought necessary. A further benefit is a reduction in operating costs, since the more expensive ingredients of the prior art electrolytes, i.e. copper nitrate and nickel nitrate, are not required in the process of the present invention.

Concerning the production of powdered lead dioxide, this material has heretofore been prepared commercially by a chemical process involving precipitation from an aqueous solution. A disadvantage of this process is the lack of uniformity of the product from batch to batch with respect to purity, reactivity, and color. This lack of uniformity has made it necessary to sample and analyze each drum of powdered lead dioxide, which is, of course, time-consuming and expensive. Frequently, the material is found, upon testing, to be entirely unuseable because of its failure to meet specifications. An electrochemical process is disclosed in Christensen Patent No. 2,925,904 but this process does not produce as pure a product as is desired nor can it be operated continuously as is the case with the present invention.

In the electrolytic production of powdered lead dioxide according to prior technology, one of the problems encountered was that of plating a heavier coating of lead dioxide onto a suitable substrate, but with the lead dioxide coating purposely being poorly non-adherent, so that when the plating is completed, the coating can readily be removed from the substrate and thereafter ground to the desired particle size. The process of this invention, however, not only solves this problem but also makes possible the production of powdered lead dioxide which possesses consistently uniform physical and chemical properties and is, moreover, of a very high degree of purity. It is possible to exercise close control over the final particle size, as the lead dioxide which is stripped from the substrate material can be calibrated to any of a wide variety of particle sizes ranging from about 0.3 micron to about one-half inch.

With respect to both the manufacture of an improved lead dioxide anode and the production of powdered lead dioxide, the greatly improved and surprising results which are obtained by the method of this invention stem particularly from the use of an improved electrolyte. Broadly speaking, the electrolyte of this invention is one in which the acid concentration is maintained substantially above previously acceptable values in conjunction with limiting of the concentration of certain other constituents of the electrolyte to prescribed levels. Not only does the use of the improved electrolyte make possible a considerably improved anode, but also makes possible the production of such anodes at substantially lower cost than was possible heretofore. The improved electrolyte also makes possible the production of powdered lead dioxide of a high degree of purity and a high uniformity of physical characteristics. Also, it is now possible to continue the plating process for a much longer time than heretofore, so that a higher volume of production than with any prior art electrolytic process of production of powdered lead dioxide is now possible.

An additional advantage of the invention resides in the ability to plate satisfactorily with lower concentrations of lead nitrate in the electrolyte. This applies both to the production of lead dioxide coated anodes and the production of powdered lead dioxide. Thus, in using the prior art electrolyte described, for example, in Patent No. 2,945,791, it is found that satisfactory plating of lead dioxide cannot occur with a lead nitrate concentration of less than about 150 grams per liter; whereas, when using the electrolyte of the present invention, we have found that the lead nitrate concentration can go as low as about 50 grams per liter and yet plate at a satisfactory rate.

In plating lead dioxide onto a substrate, it has previously been considered that the most suitable substrate material is graphite, as disclosed for example in the aforesaid Patent No. 2,945,791. However we have now discovered that other substrate materials may be used with the improved electrolyte of the invention, provided that the substrate material is properly treated prior to the electrodeposition process. For example, we have found that improved anodes may be produced on a substrate of titanium metal, and we have also found that substrates of tantalum, zirconium, hafnium and columbium can also be satisfactorily plated with lead dioxide according to the process of this invention. Anodes comprising such substrate materials have a longer useful life, are lighter in weight, are less likely to contaminate the electrolyte, and can be replated indefinitely.

According to one embodiment of the invention, when plating lead dioxide onto a substrate for use as an anode in an electrochemical cell, the process of plating is designed to produce a very tightly-adherent coating of lead dioxide to the substrate material. On the other hand, where it is desired to produce powdered lead dioxide, it becomes an objective to plate a heavy coating of lead dioxide onto the substrate which can readily be stripped therefrom and then ground, and accordingly the process of the present invention provides also for the plating of a lead dioxide coating which will readily adhere during normal handling of the substrate in the plating process but which can readily be broken off the substrate so as to be ground, with the substrate being available for repeated replating with subsequent coatings of lead dioxide.

It is an object of the present invention to provide a process for the electrodeposition of lead dioxide from an aqueous solution containing lead nitrate, but not requiring either copper nitrate or nickel nitrate, onto a base substrate material such as carbon, titanium, tantalum, zirconium, hafnium, and columbium, and their alloys.

Another object of the invention is to provide a process for the production of a lead dioxide coating on a suitable substrate material, which coating is far less likely than those of the prior art to be non-adherent, porous, or contain fissures.

It is a further object of this invention to provide for the production of lead dioxide anodes which are suitable for use as an insoluble anode in electrolytic processes using corrosive electrolytes and, in particular, for the production of sodium chlorate; sodium perchlorate; chlorine; alkali earth hypochlorites, chlorates, and perchlorates; sodium hypochlorite; sodium bromate; sodium iodate; sodium periodate; potassium chlorate and perchlorate; iodic acid; periodic acid; potassium salts of bromates, iodates, and periodates, and as an inert anode in chrome plating solutions.

Another object of the invention is to provide a process for the production of bi-polar anodes comprising flat sheets of substrate which are plated on only one side with a tightly adherent, smooth, non-porous coating of lead dioxide.

It is a further object of the invention to provide a process for the manufacture of powdered lead dioxide of uniform physical characteristics and high purity.

It is another object of the invention to provide a process for the coating of a high purity lead dioxide onto a substrate.

It is a further object of the invention to provide a process for the preparation and control of the constituency of an electrolyte for use in the electrodeposition of lead dioxide.

It is another object of this invention to achieve the depositing of lead dioxide onto a prepared substrate using a specifically formulated lead nitrate electrolyte, the constituents of which are carefully controlled, and by employing a certain sequence of operating conditions.

Describing the invention, reference will be made to the accompanying drawings in which:

FIG. 1 diagrammatically illustrates the processes of the present invention for the production of lead dioxide on a substrate material;

ELECTROLYTE

Figure 1:
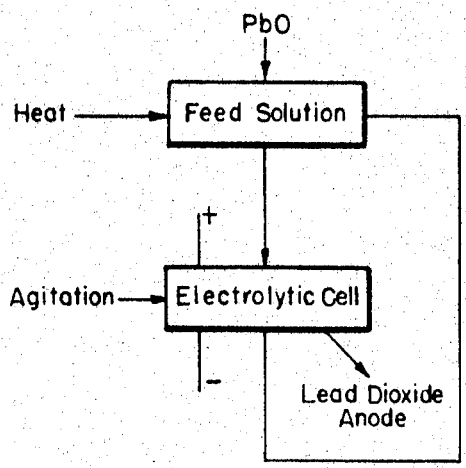

Described briefly, the improved process of our invention makes possible both the production of improved lead dioxide anodes and the production of powdered lead dioxide, together with a lowering of the cost of the production, and accomplishes this, in part, by careful control of the amounts of several constituents appearing in the electrolyte, particularly iron and chlorides. Proper control of the amounts of these constituents makes possible the elimination of both copper and nickel nitrate from the electrolyte and also makes possible the elimination of a surface-active agent. A further important result of the process of this invention, one which significantly reduces the cost of lead dioxide plating, is the ability to operate the cells almost continually. This is in sharp contrast to the prior art processes which required periodic cell shutdown, particularly to remove copper that plated on the cathodes.

More specifically, the electrolyte of this invention comprises an aqueous solution which comprises lead nitrate in the concentration of about 50 to about 200 grams per liter of anhydrous lead nitrate, nitric acid in the concentration of about 5 to about 20 g.p.l., and sodium fluoride in the concentration of about 0.5 g.p.l. During the electrodeposition process, it is periodically necessary to replenish the lead in the electrolyte. Accordingly, at the start of deposition, it is desirable to have the lead nitrate concentration near the 200 grams per liter value stated above, which is near saturation. The lower level of 50 grams per liter mentioned above has been found to be a practical lower limit, below which the plating process proceeds only quite slowly. The electrolyte is treated to limit the concentration of iron, calculated as metallic iron, to a value in the range of 0 to about 0.02 g.p.l., and is also treated to remove chlorides. It should be understood that a concentration of .02 g.p.l. of iron does not constitute an upper limit for iron at which a substrate can satisfactorily be plated with lead dioxide but rather represents a control limit for production of lead dioxide coatings of consistently high quality. Thus, anodes have been plated in solutions having iron content of .05 to .10 g.p.l. of iron, but it has been found that the rejection rate is then at an unsatisfactorily high level. Incidentally, the amount of iron present is determined through the use of sulfosalicylic acid with a pH of 2.0 (colorimetric).

The electrolyte of the present invention is thus substantially different from what has heretofore been used in the plating of lead dioxide. As previously stated, it has been customary to employ an aqueous solution of lead nitrate, with added ingredients comprising nitric acid, copper nitrate, nickel nitrate, sodium fluoride, and a surface active agent. Moreover, it has been found in the past that the concentration of nitric acid must be kept below about 5 grams per liter since otherwise it was impossible to plate a continuous coating of lead dioxide onto the substrate. Now, however, control of the amounts of the constituents of the electrolyte, particularly the iron, in conjunction with the employment of a significantly higher concentration of nitric acid, i.e. about 5 to about 20 grams per liter, makes possible the elimination of the copper nitrate and also the nickel nitrate, thereby not only reducing the cost of manufacture of plating of lead dioxide, but also resulting in a far higher quality of anode when the process of the invention is used to prepare lead dioxide anodes, and correspondingly, a higher degree of purity of lead dioxide when the invention is used to manufacture powdered lead dioxide. Of course, it is possible to have small amounts of copper nitrate in the electrolyte without detriment. Thus, where the appended claims refer to the "substantial absence" of any material, e.g. copper nitrate, it should be understood that the amount of copper nitrate which might in normal practice be introduced as an impurity in one or more of the raw materials, can readily be tolerated. A further advantage of the invention is that, whether anodes or powdered lead dioxide are being produced, the process can now be operated without frequent shut-downs, as will later be explained, thereby substantially reducing production costs.

For the most part, iron, chlorides and organics are introduced into the electrolyte from the substrate material. Thus, iron frequently appears in trace or larger amounts throughout the body of the substrate, and various organics may also be present on the surface thereof. Iron is also introduced as a result of the periodic addition of litharge to the electrolyte, since minute quantities of iron are frequently present in the litharge. Chlorides and organics are also introduced with the water which is used in the preparation of the electrolyte, even when treated water is used.

With respect to the elimination of the copper nitrate from the electrolyte, this becomes possible indirectly as a result of the close control of the amount of iron in the electrolyte. Thus, we have found that when the amount of iron is carefully restricted and a higher amount of acid, i.e. from about 5 to 20 grams per liter of nitric acid, is used in the electrolyte, the copper nitrate whose principal effect has been to effect preferential plating of copper rather than lead on the cathodes becomes unnecessary. Previously, a high acid concentration in the electrolyte was found to be undesirable since it was found that anodes of inferior quality were produced, and the concentration of nitric acid was accordingly limited to about 2 to 3 grams per liter.

Nickel nitrate has heretofore been added to the electrolyte because of its function as a crystalline modifier having the effect of producing a finer grain of the lead dioxide plating. It has been found, however, that entirely satisfactory results are obtained by using the electrolyte of the present invention which contains no nickel nitrate. If it is desired to use nickel nitrate, nevertheless, in order to produce an especially fine grain of lead dioxide coating, then nickel nitrate may be added with a concentration of about 10 grams per liter.

During the course of the electrodeposition process, whether plating anodes or plating a substrate for the purpose of manufacturing powdered lead dioxide, it is necessary to replenish the lead in the electrolyte and also to maintain the electrolyte at the proper pH. This is accomplished by feeding the effluent from the cell to a feed tank and thereafter adding lead dioxide as required to maintain an acid concentration of approximately 5 to 20 grams per liter and a lead nitrate concentration of approximately 200 grams per liter. A continuous circuit is provided so that the replenished electrolyte is continuously fed to the cell. The electrolyte is heated in the feed tank to maintain an electrolyte temperature in the cell in the range of about 73 to about 92° C.

Reference may be made to FIGURE 1 which illustrates diagrammatically the process of the present invention and particularly discloses the addition of litharge to the feed solution. As shown, the feed solution is heated to the prescribed temperature and then allowed to flow to the electrolytic cell where constant agitation is maintained.

At repeated intervals, samples of the electrolyte are tested to determine the amount of iron and chlorides present. Whenever either of these constituents is found to exist in an amount exceeding predetermined limits, a portion of the electrolyte is withdrawn from the continuous circuitry described and transferred to a treatment tank.

With respect to the upper limit of iron which can be present in the electrolyte, numerous experiments have demonstrated that the quality of the lead dioxide plate will start to deteriorate when the iron content exceeds .02 gram per liter, at least at the start of the electrodeposition process. It has been found that the amount of iron can be permitted to go somewhat above this limit once the plating process is started.

With respect to chlorides and organics, treatment is undertaken to remove these from the electrolyte whenever inspection of the anode plated lead dioxide shows the slightest evidence of the presence of these materials.

As previously stated, one of the outstanding attributes of the present invention resides in the ability to have the process operate almost continuously. In the prior art systems, where copper nitrate is added to the electrolyte to effect preferential plating, the cathode eventually becomes fully covered by copper, and it is periodically necessary to remove the copper plating since otherwise the cathodes will short to each other or to the anode. One way in which the copper has been removed in the past is to shut down the cell after a set of anodes has been plated and then to recirculate the electrolyte through the cell until the copper has been dissolved. Such a procedure has the distinct disadvantage that the cell must be out of operation throughout the rather considerable time taken to dissolve the copper. An alternative means used in the prior art processes is to add acid to the electrolyte in the amount required to dissolve the copper, then to add litharge in the amount to neutralize a portion of the excess acid, but this procedure has the disadvantage that the lead concentration gradually increases so that, as the process is continually repeated, the lead concentration eventually reaches saturation. To prevent this, it is necessary to add water and copper nitrate, but this means that the quantity of electrolyte in the system is continuously being increased, which necessarily results in increased costs of operation.

By means of the present invention, on the other hand, both of the expedients employed by the prior art become unnecessary since preferential plating is not employed. Excessive build-up of lead on the cathodes does not occur with the electrolyte of the present invention. Because of this, there is no need to shut down the cell with the result that when one set of anodes is plated, another set can immediately be started.

An additional advantage resulting from control of the amount of iron present in the electrolyte is the better utilization of the sodium fluoride which generally constitutes one ingredient of the electrolyte. Sodium fluoride is usually added to provide a greater anode efficiency in the plating process. When iron is present to any substantial extent in the electrolyte, much of the sodium fluoride becomes unavailable for its intended use because the iron combines with the sodium fluoride to produce iron fluoride $Fe_2F_6$. Reducing the iron content to less than .02 grams per liter makes considerably more of the sodium fluoride available for its intended use. In addition, it has been found that the reduction of iron below the maximum level specified results in considerably less criticality in the amount of sodium fluoride which must be present in the electrolyte to obtain the desired anode efficiency. Incidentally, although fluoride is usually employed in the form of sodium fluoride, other forms of soluble fluoride may instead be used.

PLATING OF ANODES

Various types of materials may be used for the cathodes of the electrolytic cell. Thus, we have found that stainless steel, graphite, copper, and titanium are suitable for cathode use. Preferably, we use a plurality of stainless steel rods of circular cross section in order to give a high current density when lead dioxide anodes are being prepared. The rods are disposed at intervals about the surface of the anode being plated. Preferably, the total cathode area is such as to give a cathode current density which is about 1.5 to about three times the corresponding anode density. With respect to the electrode voltage employed, this may vary from about 1.9 volts to about 3.5 volts according to the magnitude of current desired.

In the plating of lead dioxide anodes, it is of course essential that the lead dioxide coating be tightly adherent to the substrate. To accomplish this, it is advisable to deposit the lead dioxide in one continuous operation without interruption of the current. As in the prior Gibson Patent No. 2,945,791, we find it highly advantageous to vary the current density of the anode from a relatively high level for the initial plating interval to a substantially lower level for the remaining hours of electrodeposition. In plating anodes on a substrate of circular cross section, a two-step plating process produces very satisfactory results. Thus, the current density is initially adjusted for a value in the range of about 75 to about 100 amperes per square foot at the anode for the first one to three hours of electrodeposition when plating lead dioxide on a graphite substrate, with the current being reduced to a lower value of about 20 to 60 amperes per square foot for the remaining hours of electrodeposition. When plating lead dioxide on the other substrate materials mentioned above, such as titanium, tantalum, zirconium, hafnium, and columbium, it is preferable to use a value of current in a somewhat lower range as for example in the range of about 58 to 95 amperes per square foot for an initial plating interval of about one to three hours, followed by a second plating interval where the current density is about 30 to about 43 amperes per square foot for an additional plating interval of such length as to give a total plating time of about 5 hours.

Where the anode being plated is of generally rectangular cross section, it may be preferable to provide for three successive plating periods, with the current density being reduced on each successive interval. Apparently the stresses in the plating which occur upon use of the anode and which result from thermal expansion and contraction are greater with an anode having rectangular cross section, and the use of three successive plating intervals with reduced current density at each step tends to produce an even more adherent coating than does the two-step plating process.

It is preferable to treat the substrate prior to placing it in the electrolytic cell. Where the substrate is graphite, it is preferably first planed by an electric planer to remove approximately $\frac{1}{16}''$ of graphite from the faces of the substrate. Also, the substrate is first soaked in demineralized water for the purpose of removing entrained air.

In plating anodes upon the substrate materials comprising titanium, tantalum, zirconium, hafnium or columbium, a different treatment is employed than when graphite is used for the substrate. Whereas the graphite has a relatively coarse surface, with rough irregularly shaped edges to which a lead dioxide plating can quite readily adhere, the above-mentioned metals tend to have a much smoother surface, and it has been found that this surface must be treated to give it a substantially jagged and uneven surface having both rough depressions and jagged protruding surfaces. This is best accomplished by subjecting the surface to sandblasting since it has been found that this treatment tends to produce rough, irregular craters in the surface of the substrate, thereby greatly enhancing the adherence of the lead dioxide to the plate. Subsequent to this sandblasting treatment, the substrate is heated by placing it in a soaking bath whose temperature is equal to or slightly above that of the plating cell temperature.

Also, in plating lead dioxide anodes where titanium or one of the other metals mentioned above is used as the substrate, it has been found preferable to have the substrate in the form of a metal tube rather than a solid rod. The interior of the tube is filled with sand just before heating the substrate in the soaking bath, and this helps to retain heat in the substrate material and thus inhibit thermal shock. It also helps to keep the tube submerged when first placed in the plating bath since otherwise the tube would tend to float on the surface.

When it is desired to plate lead dioxide on a relatively thin plate of titanium, tantalum, zirconium, hafnium and columbium, it is found that there is a natural tendency of the lead dioxide coating to curl and thereby bend the sheet. Although this tendency of the coating to curl presents no problem when plating onto a circular anode, it does present problems when plating a flat sheet since, not only is there a bending of the sheet, which is a serious disadvantage when using the anode in a cell, but also stresses are produced in the coating because of its inherent tendency to curve so that there is a lack of adherence of the coating, particularly in the central portion of the plate.

Figure 3:
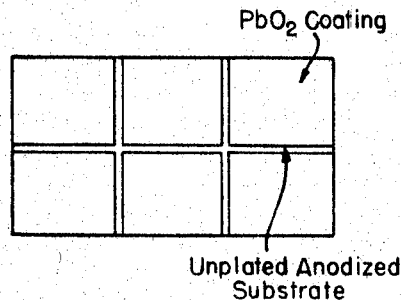
FIG. 3 illustrates a flat plate of substrate material which is plated only in selected areas of its surface with a coating of lead dioxide.

To overcome this, we have found that by dividing the plated area of the sheet into a number of discrete areas, the stress which may be produced in any one elemental area will not be transmitted to the next. Thus, when plating an anode formed from a rectangular sheet of, for example, ten inches by thirty inches, it is found that substantially all of the curling can be eliminated by plating the sheet in six different small elemental areas as shown in FIGURE 3. This is accomplished by anodizing the entire surface of the sheet and then removing the anodized coating in all areas where it is desired to subsequently plate the lead dioxide. Removal of the anodization may be carried out by sand blasting the sheet.

Anodization of the sheet may be carried out in any of numerous ways, since any method may be used that electrically passivates the metal. One way in which this may be done is set forth below in Example IV.

A similar method may be used to manufacture a bipolar lead dioxide coated anode. Thus, the metal sheet forming the substrate is first anodized on both surfaces as indicated above. Upon completion of anodization, that side of the sheet which is to form the anode has elemental areas thereof sand blasted so as to remove the anodizing, thereby conditioning the substrate for the coating of lead dioxide thereon. The opposite side of the sheet, which is to serve as a cathode, retains the anodized coating so that when the sheet is immersed in the plating cell, no lead dioxide will plate onto that side of the sheet. When the plating process is complete, the anode side of the substrate will have a plurality of relatively small areas thereon each coated with a coating of lead dioxide, whereas the other side of the sheet will have no lead dioxide plated thereon but will instead have only an anodized surface.

In plating lead dioxide onto any of the substrates referred to above, satisfactory coatings have been obtained with a thickness of about $\frac{1}{32}''$ to about $\frac{1}{2}''$, but a coating of about $\frac{1}{16}''$ to $\frac{3}{16}''$ is preferred. By proceeding as outlined above, a lead dioxide deposit is produced having the characteristics of a fine crystalline, randomly-oriented structure, having a hard smooth surface, high tensile strength and strong adherence to the substrate.

PRODUCTION OF POWDERED LEAD DIOXIDE

In the production of powdered lead dioxide, it is, of course, desired that the lead dioxide plated onto the substrate be readily removable therefrom. To accomplish this, the substrate, which may be either titanium, tantalum, zirconium, hafnium or columbium, is first abraded as with a wire brush. This thoroughly cleans the surface of the substrate, but does not produce the rough and jagged surface which is provided by sand blasting, as is done when the substrate is to be plated for use as an anode. Following this surface treatment, a thin coating of lead dioxide is plated onto the substrate, and this is followed by removal of the substrate from the cell and washing. The anode is then re-inserted in the cell and plating is started again.

The removal of the substrate from the cell, even though briefly, provides a definit discontinuity between the initial, thin plating of lead dioxide and the subsequent heavier plating. This facilitates the easy stripping of the heavy plating from the anode without disturbing the tightly adhering initial coating. If this were not done, it would be difficult to strip the lead dioxide from the anode substrate, as a tight bond is formed between the substrate and the initial layer of lead dioxide. Of course, after the first usage of the anode, the treatment just described need not be repeated since the initial thin coating is retained indefinitely, and the same substrate may be re-plated over and over again repeatedly.

Figure 4:
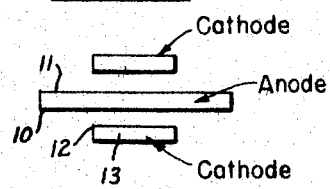
FIG. 4 illustrates a preferred arrangement of the electrodes in a cell for the production of thick coatings of lead dioxide intended for the production, ultimately, of powdered lead dioxide.

In producing coated lead dioxide by electrodeposition, it is desirable that the anode current density not be allowed to exceed about 60 to 70 amperes per sq. ft. If the current density is permitted to go above this range, there is substantial "treeing" of the lead dioxide at the anode which may eventually result in a short circuit between the anode and cathode. To prevent the current density from reaching an excessive value locally, precautions are taken to prevent the respective edges of the anode and cathode from being immediately adjacent to each other. Thus, the anodes and cathodes may be positioned relative to each other in a manner shown in FIGURE 4. In FIGURE 4, the anode and cathode both have a generally rectangular cross section, but the anode is wider than the cathode as shown, and the two are so positioned relative to each other as to prevent edge 10 of anode 11, for example, from being immediately adjacent a corresponding edge 12 of cathode 13.

Although a maximum anode current density value has been stated above, it should be understood that this value does not represent an absolute upper limit but instead represents a value above which "treeing" occurs at a rapid rate. When steps are taken to remove the treed plating periodically, so as to prevent short circuits, then current densities above 60 to 70 amperes per sq. ft. can be used with a proportionate reduction in plating time to achieve a given thickness of plating.

Plating is generally carried on until about $\frac{1}{4}''$ thickness of lead dioxide plating is acrieved. With an anode current density of about 65 amperes per sq. ft., about 24 hours are required to obtain a plating of this thickness. A practical upper limit for the plating time is that which produces a plating of such thickness that the plating comes into contact with the cathode.

After the plated anode is removed from the cell, the plating is removed mechanically, and this may readily be accomplished in any of numerous ways since the discontinuity between the thin initial plating and the subsequent heavier plating greatly facilitates the removal of the outer layer of lead dioxide. One very convenient way in which to remove the lead dioxide is simply to flex the plate as this quickly fractures the coating which then breaks off in large pieces.

The lead dioxide is then washed with de-mineralized water to prevent the formation of lead sulphate precipitates and to remove all traces of lead nitrate. The lead dioxide is then crushed and then finally ground to the desired particle size.

The following example illustrate our process for production of lead dioxide anodes:

EXAMPLE I

A graphite anode substrate is prepared for electrodeposition by removing approximately 1/16 inch of graphite from the faces of the substrate by means of an electric planer. The edges of the graphite base are then rounded and the bottom end cut in a semi-circular shape. Immediately preceding electrodeposition, the substrate is soaked in demineralized water for ½ to 1 hour at a temperature of 90° C. to 95° C. Upon removal from the soaking bath, the substrate is immediately transferred to the electrolyte.

An aqueous electrolyte is prepared containing the following compounds in the concentrations shown for each:

Grams per liter
$Pb(NO_3)_2$ ------------------------------------ 200
NaF ---------------------------------------- 0.5
$HNO_3$ ---------------------------------------- 5–20

The electrolyte is tested to determine the amount of iron present. Provided that such test shows that iron is present in an amount greater than .02 gram per liter, the following procedure is used: Litharge is added in an amount to drop the free acid content from its then-existing value to the range of about .5 to about 1.0 gram per liter. After this, lead carbonate is added to raise the pH to the region of about 3.8 to about 4.0. After this, the solution is boiled and subsequently allowed to set one hour at a temperature not less than 80° C. throughout which time the pH is not allowed to drop below 3.8. During this time, the iron precipitates out of solution and is readily removed by filtration. It is important that the pH be maintained between the prescribed limits during the setting time since, if the pH is allowed to go above about 4.0, lead will also precipitate out of solution; whereas, if the pH is allowed to go substanitally below 3.8, the iron will go back into solution. After this, acid is added to raise the acid content to the normal value of 5 to 20 grams per liter before starting to plate the graphite anodes.

In the foregoing treatment, it is possible to use lead carbonate from the beginning rather than to add first litharge and subsequently lead carbonate, but this has the disadvantage of being more costly because of the higher cost of lead carbonate as compared to litharge. It is also possible, as another alternative, to use litharge throughout rather than to use litharge first and subsequently lead carbonate, but the disadvantage of this alternative is the greater difficulty in controlling the pH of the solution as it reaches the desired range of about 3.8 to about 4.0.

Figure 2:
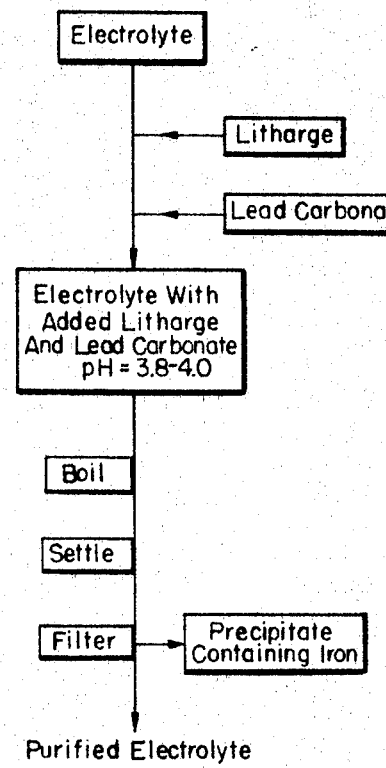
FIG. 2 is a flow diagram illustrating the process of the present invention for treatment of the electrolyte to remove iron therefrom.

Reference may be made to the flow diagram of FIGURE 2 which illustrates the foregoing process for the removal of iron from the electrolyte.

The electrolyte is poured into a cell and heating and agitation of the solution is started. On reaching a temperature of 85° C., the graphite anode and stainless steel cathodes are installed and electrodeposition is started. Electrical connection is made directly to the graphite substrate above the solution level before immersion in the electrolyte. Immediately after immersion, the current is turned on to avoid any battery action.

Circulation of electrolyte is started at the same instant electrodeposition is initiated and is continuous thereafter. Litharge (PbO) is added to the electrolyte as it leaves the cell in a sufficient quantity to maintain the nitric acid ($HNO_3$) concentration in the rangt 5–20 grams per liter. Agitation of the electrolyte is continuous throughout the plating time.

Table 1.—Operating conditions for Example I

Electrolyte, grams per liter:
    $Pb(NO_3)_2$ ---------------------------------- 200
    NaF ------------------------------------ 0.5
    $HNO_3$ ---------------------------------- 5–20

Anode: 1¼″ x 6¼″ x 30″ untreated graphite, surface cleaned and edges rounded. Immersed in solution 24″ giving available plating area of approximately 320 square inches.

Cathode: 11 stainless steel (type 316) rods each ⅜″ x 29″ and evenly spaced about the anode with 5 on each side.

Spacing: 2″ between cathode surface and anode surface.
Temperature: 73–92° C.
Current density:

|  | First 60 minutes | Next 120 minutes | Next 300 minutes |
|---|---|---|---|
| Anode, amps./sq. ft. | 106 | 53 | 27 |
| Cathode, amps./sq. ft. | 128 | 64 | 32 |
| Applied current, amps. | 235 | 117 | 59 |
| Voltage | 4.4 | 2.8 | 2.0 |

At the end of eight hours, electrodeposition is stopped. The anode is removed from the cell and throughly washed with water to remove the drag-out. That portion of the graphite immersed in the plating solution is found to be completely covered with a very smooth, compact, finely-crystalline, firmly-adherent layer of lead dioxide free of cracks and nodules.

Prior to the insertion of another anode into the cell, the electrolyte is again tested to determine the amount of iron present and, whenever such test shows that iron is present in an amount greater than .02 gram per liter, the procedure set forth above is followed to remove the excess iron. In addition, when any anodes produced show any evidence of defective plating which could be attributable to the presence of organics, such as the plating of a non-adherent coating as the result of the presence of a localized film of oil or the like on the substrate, the electrolyte is first treated by passing it through a bed of activated carbon, e. g. charcoal type, to remove such organics. Also, any evidence of extreme brittleness of the lead dioxide plating which would be the result of the presence of an excess amount of chlorides in the electrolyte, necessitates the following procedure to remove such excess chlorides: Fluoride is added in an amount at least equalling 0.5 gram per liter. The solution is then cooled to about 50° C. and the pH adjusted to be within the range of about 3.4 to about 3.6. The electrolyte is then cooled to the range of 25° C. to 30° C. and allowed to set for two hours, during which time the chlorides precipitate out of solution in the form of a lead chlorofluoride complex PbClF.

EXAMPLE II

The procedure of Example I is followed as set forth above except that the anode is of circular cross-section, being 4⅛″ in diameter by 45 inches long, of untreated graphite, with the lower end rounded in a hemispherical shape.

Table 2.—Operating conditions for Example II

Electrolyte, grams per liter:
    Lead nitrate ---------------------------- 200
    Nitric acid ---------------------------- 5–20
    Sodium fluoride ---------------------------- 0.5

Anode: 4⅛″ diameter, 45″ long, graphite rod 39 13/16″ immersed, effective area approximately 516 square inches.

Cathode: 11 stainless steel rods, each ⅜″ x 43″ and evenly spaced about the circular anode.

Spacing: 2″ between adjacent surfaces of anode and each cathode.

Temperature: 73°–92° C.
Current density:

|  | First 180 minutes | Next 120 minutes |
|---|---|---|
| Anode, amps./sq. ft | 90 | 70 |
| Cathode, amps./sq. ft | 90 | 70 |
| Voltage | 3.1 | 2.3 |

Total plating time: 5 hours.

At the end of electrodeposition, the anode is removed from the cell and thoroughly washed with water to remove the drag-out. That portion of the graphite immersed in the electrolyte is found to be completely covered with a smooth, compact, firmly-adherent layer of lead dioxide free of cracks and pinholes.

EXAMPLE III

A titanium substrate comprising a hollow tubular member having a rounded hemispherical bottom is prepared for electrodeposition by sand blasting its surface. Thereafter, the substrate is degreased and cleaned of contaminants by washing with either a strong detergent or with a solvent such as acetone. Immediately preceding electrodeposition, the substrate is preheated in a demineralized water at a temperature about 4 to 5° C. above the temperature of the electrolyte in the plating cell to ensure that the temperature of the substrate will not appreciably vary from that of the electrolyte during the interval that the substrate is being transferred to the plating bath. Upon removal from the preheating bath, the substrate is immediately transferred to the electrolyte.

The eletrolyte is the same as in Example I, and the procedure of Example I is used to test the electrolyte for the presence of iron and to remove excess iron in the event that such test shows that iron is present in an amount greater than .02 gram per liter. The hollow tube of the substrate is filled with sand in order to retain heat and inhibit thermal shock, and also to stabilize the unplated titanium tube in the plating bath, since otherwise the tube would tend to float.

Circulation of the electrolyte is started at the same instant electrodeposition is initiated and is continuous thereafter. Litharge (PbO) is added to the electrolyte as it leaves the cell in a sufficient quantity to maintain a nitric acid ($HNO_3$) concentration in the range of 5–20 grams per liter. Agitation of the electrolyte is continuous throughout the plating time.

Table 3.—Operating conditions for Example III

Electrolyte, grams per liter:
  Lead nitrate _____ 200
  Sodium fluoride _____ 0.5
  Nitric acid _____ 5–20

Anode: Hollow titanium tube, 1" diameter, 12" long with bottom end rounded and enclosed and upper end open. Tube filled with sand, 8" immersed, effective plating area approximately 25 sq. in.
Cathode: Four graphite rods, each ⅜" diameter x 7" long and evenly spaced about the anode.
Spacing: 2" between adjacent surfaces of anode and each cathode.
Temperature: 73° C.–92° C.
Temperature: 73° C.–92° C.
Current density:

|  | Elapsed time | |
|---|---|---|
|  | First 180 minutes | Next 120 minutes |
| Anode, amps./sq. ft | 65 | 42 |
| Cathode, amps./sq. ft | 50 | 33 |
| Voltage | 2.6 | 2.2 |

Total plating time: 5 hours.

The anode is removed from the cell and thoroughly washed with water to remove the drag-out. That portion of the titanium substrate immersed in the plating solution is found to completely covered with a very smooth, compact, finely crystalline, firmly adherent layer of lead dioxide free of cracks and nodules.

Prior to the insertion of another anode into the cell, the electrolyte is again tested to determine the amount of iron present and, whenever such test shows that iron is present in an amount greater than .02 gram per liter, the procedure set forth above is followed to remove the excess iron. Also, when any anodes produced show any evidence of defective plating which could be attributable to the presence of organics or chlorides (as referred to in Example I, above), the procedure set forth under Example I is used to remove such contaminants.

EXAMPLE IV

The procedure of Example III is followed as set forth above except that the anode comprises a sheet of titanium in rectangular form and measuring 10" x 30" x 1/16" thick.

The titanium substrate is first anodized in an electrolytic cell containing sodium chloride in a concentration of about 1.5 to 2.0 grams per liter, a natural pH in the range of 5 to 6, and about .5 gram per liter of sodium chromate. The sheet of titanium is placed in the electrolyte and current is applied with a voltage of about 4 to 5 volts. As power is continually applied, an increasing level of voltage is applied to maintain a constant current density of about .16 to about .2 ampere per sq. in., until a final plating voltage of about 28 volts is reached. In any event, anodization is continued until the final voltage value is in excess of that which is expected to be applied to the resulting anode when used in an electrochemical cell.

Upon removal from the anodizing bath, the plate is first washed. Thereafter, selected portions of the plate are sand blasted to remove portions of the anodizing and also to provide a rough and jagged surface to which the lead dioxide will adhere. One typical way in which the plate may be sand blasted to leave a pattern of discrete elemental areas of substrate which retain the anodized coating and subsequently will not be plated with lead dioxide is shown in FIGURE 4.

After the sandblasting, the substrate is further treated by degreasing and cleaning and soaking in the soaking bath, all as set forth in Example III.

EXAMPLE V

The procedure of Example III is followed as set forth above except that the anodized coating is retained entirely on one side of the plate so that side will not be plated with any lead dioxide on its surface. On the opposite surface, the anodized coating is removed selectively so that only separate, elemental areas will subsequently be plated with lead dioxide, as shown, for example, in FIGURE 4. The anode prepared in this way is subsequently used as a bi-polar anode.

EXAMPLE VI

The procedure of Example IV is followed as set forth above except that the anode substrate, instead of being formed of titanium, is formed of tantalum.

EXAMPLE VII

The procedure of Example IV is followed as set forth above except that the anode substrate is formed of zirconium.

EXAMPLE VIII

The procedure of Example IV is followed as set forth above except that the anode substrate is formed of hafnium.

15
EXAMPLE IX

The procedure of Example IV is followed as set forth above except that the anode substrate is formed of columbium.

EXAMPLE X

A sheet of substrate, formed of titanium, tantalum, zirconium, hafnium or columbium is first abraded, as by a wire brush. Immediately preceding electrodeposition, the substrate is soaked in de-mineralized water and is thereafter immediately transferred to the electrolyte.

An aqueous electrolyte is prepared as in Example I above, and the electrolyte is tested to determine the amount of iron present. Provided that the test shows that iron is present in an amount greater than .02 gram per liter, the procedure set forth in Example I for removal of the excess iron is followed.

The electrolyte is poured into a cell and heating and agitation of the solution is started. On reaching a temperature of 85° C., the substrate and graphite cathode are installed and arranged substantially as illustrated in FIGURE 3, and electrodeposition is started. Electrical connection is made directly to the substrate above the solution level before immersion in the electrolyte. Immediately after immersion, the current is turned on to avoid any battery action.

Circulation of the electrolyte is started at the same instant electrodeposition is initiated and is continuous thereafter. Litharge (PbO) is added to the electrolyte as it leaves the cell in a sufficient quantity to maintain the nitric acid ($HNO_3$) concentration in the range of 5–20 grams per liter. Agitation of the electrolyte is continuous throughout the plating time.

Table 4.—Operating conditions for Example X

Electrolyte, grams per liter:
  Lead nitrate _____ 200
  Sodium flouride _____ 0.5
  Nitric acid _____ 5–20

Anode: 1/16 x 8 x 30″ titanium, tantalum, zirconium, hafnium or columbium, with surfaces abraded by wire brush. Immersed in solution 26″ giving available plating area of approximately 416 sq. in.
Cathode: A cathode measuring 1/16 x 5 x 30″ is disposed on each side of the anode.
Spacing: 2½″ between cathode surface and anode surface.
Temperature: 73° C.–92° C.
Current density: 65 amperes per sq. ft.
Plating time: About 24 hours or until a coating of about ¼″ thickness is obtained on all surfaces of the anode.

For the first use of the substrate, a thin film of lead dioxide is plated onto its surface by plating the anode in the electrolyte and allowing plating to proceed for only a few minutes. The anode is then removed from the electrolyte, washed in demineralized water, and then reinserted into the electrolyte, after which plating occurs as set forth above. The initial thin film of lead dioxide is retained on the anode after the heavier coating is removed so that it is not necessary to plate a thin film onto the anode again during subsequent replating.

Upon removal of the anode from the cell, the lead dioxide coating is mechanically removed as by flexure of the substrate, which causes the lead dioxide coating to fracture and break off. The lead dioxide is then washed with demineralized water and broken with a jaw crusher into pieces not exceeding ¼″ in any dimension. Following this, the crushed lead dioxide is broken up in a hammer mill to a particle size of not exceeding 3.5 microns. Thereafter, the particles of lead dioxide are fed to a fluid energy-type mill, which further reduces the particle size the desired amount, to a low of about .3 micron.

What we claim is:

1. In a method of operating an electrolytic cell for electrodeposition of lead dioxide on a substrate anode in an electrolyte which includes lead nitrate and free nitric acid, the improvement which comprises: commencing the electrodeposition with electrolyte having an iron concentration therein of no more than about .02 gram per liter, calculated as free iron; introducing iron into the electrolyte as an impurity during the operation of the cell; before the iron content in the electrolyte reaches a concentration of 0.1 gram per liter, and during operation of the cell, removing from the cell a portion of the electrolyte, treating the removed electrolyte for reducing the iron concentration to a level below about .02 gram per liter, calculated as free iron, and returning the treated electrolyte to the cell; and while operating the electrodeposition substantially continuously, maintaining free nitric acid and lead nitrate in the electrolyte at concentrations in the ranges of about 5 to about 20 grams per liter and about 50 to about 200 grams per liter, respectively.

2. The method of claim 1 in which said substrate is in the form of a thin, flat sheet, said process including the further step of passivating a surface of said sheet except for a plurality of substantially non-contiguous areas thereof to thereby permit the plating of said lead dioxide coating only on said non-contiguous areas, whereby curling of said sheet is prevented.

3. The method of claim 2 in which said sheet is passivated over its entire surface by anodization of said sheet, said process further including the step of thereafter removing said anodization from said substantially non-contiguous areas to permit plating of lead dioxide thereon.

4. The method of claim 2 in which one side of said sheet is passivated over its entire surface, thereby preventing the plating of any lead dioxide coating thereon to thereby form a bi-polar anode.

5. In the method according to claim 1, a method for treating said electrolyte to render said electrolyte substantially free of iron, said method comprising the steps of adding litharge to reduce the free acid content to the range of about 0.5 to about 1.0 gram per liter, adding lead carbonate to raise the pH to the range of about 3.8 to about 4.0, boiling the electrolyte, allowing the boiled electrolyte to settle at least about one hour at a temperature not less than about 80° C. and with a pH not lower than about 3.8, and filtering the electrolyte to remove the resultant precipitated iron.

6. The method of claim 9 in which said chlorides are removed by adding at least about 0.5 gram per liter of fluoride to said electrolyte while said electrolyte is at a temperature in the range of about 73° C. to about 92° C., cooling said electrolyte on the order of about 50° C., adjusting the pH of the electrolyte to about 3.4 to about 3.6, cooling the electrolyte still further to a temperature in the range of about 25° C. to about 30° C., allowing the electrolyte to set for at least about two hours, and filtering the resultant precipitate from the electrolyte, leaving a purified electrolyte which is substantially free of chlorides.

7. The method of claim 1 performed in the substantial absence, in said electrolyte, of nickel nitrate.

8. The method of claim 1, performed in the substatial absence, in said electrolyte, of both copper nitrate and nickel nitrate.

9. The method of claim 1 in which the electrolyte is treated to remove substantially all chlorides.

10. The method of claim 1 in which the substrate material is graphite.

11. The method of claim 1 in which the substrate material is titanium.

12. The method of claim 1 in which the substrate material is zirconium.

13. The method of claim 1 in which the substrate material is hafnium.

14. The method of claim 1 in which the substrate material is columbium.

15. The method of claim 1 performed in the substantial absence, from said electrolyte, of copper nitrate.

16. The method of claim 1 in which the anode current density is varied during the deposition process from an initial high value of about 58 to about 95 amperes per square foot to a subsequent lower value of about 20 to about 60 amperes per square foot.

17. The method of claim 1 in which said substrate, prior to electrodeposition, is sandblasted on those surfaces which are to be plated with lead dioxide to thereby produce a rough and jagged surface to which said coating will tightly adhere.

18. The method of claim 1 in which, during the electrodeposition, the iron concentration in the electrolyte is periodically measured, and, when an iron concentration, calculated as free iron, greater than about .02 gram per liter is detected, electrolyte withdrawn from the cell is treated for reducing the iron concentration to below about .02 gram per liter and is returned to the cell.

19. The method of claim 1 in which the substrate material is tantalum.

20. The method of claim 1 wherein said step of removing iron from a portion of the electrolyte is performed before the iron content in the electrolyte reaches a concentration of 0.05 gram per liter.

21. The method of claim 1, wherein the iron concentration of the electrolyte, calculated as free iron, is no more than about 0.02 gram per liter throughout the electrodeposition.

22. The process of electrodepositing a lead dioxide coating on a substrate anode in an electrolytic cell comprising, depositing said coating on said anode from an electrolyte consisting essentially of lead nitrate and nitric acid, maintaining the nitric acid concentration in the range of about 5 to about 20 grams per liter throughout the electrodeposition maintaining the lead nitrate concentration in the range of about 50 to about 200 grams per liter throughout the electrodeposition, measuring the amount of free iron present in the electrolyte at least at the start of the electrodeposition of said coating on a set of anodes in said cell, transferring a portion of the electrolyte to a treatment tank when the measurement of iron shows iron to be present in a concentration greater than about .02 gram per liter, treating the electrolyte in the treatment tank to reduce the iron concentration below about .02 gram per liter and returning the treated electrolyte to the electrolytic cell, the transferring of the electrolyte to said treatment tank, and the return of the treated electrolyte to the cell occurring without interruption of the electrodeposition of said coating on the anodes then in the cell.

References Cited

UNITED STATES PATENTS

| | | | |
|---|---|---|---|
| 2,225,904 | 12/1940 | Christensen | 204—83 |
| 2,865,832 | 12/1958 | Pitzer | 204—285 XR |
| 1,911,604 | 5/1933 | Calbeck | 23—146 XR |
| 2,773,816 | 12/1956 | Wesley et al. | 204—12 |
| 2,835,630 | 5/1958 | Huddle et al. | |
| 2,872,405 | 2/1959 | Miller et al. | 204—57 XR |
| 2,936,327 | 5/1960 | Schrodt et al. | 204—57 XR |
| 2,945,790 | 7/1960 | Grigger | 204—57 |
| 2,945,791 | 7/1960 | Gibson | 204—57 |
| 2,994,649 | 8/1961 | Morrison et al. | 204—57 |
| 3,033,908 | 5/1962 | Darland | 204—57 XR |
| 3,035,990 | 5/1962 | Davis et al. | 204—33 |
| 3,148,129 | 9/1964 | Basseches et al. | 204—42 XR |

JOHN H. MACK, Primary Examiner

G. L. KAPLAN, Assistant Examiner

U.S. Cl. X.R.

204—29, 57, 96, 290; 210—42, 59